(12) United States Patent
Morrow

(10) Patent No.: US 7,028,481 B1
(45) Date of Patent: Apr. 18, 2006

(54) HIGH EFFICIENCY BRAYTON CYCLES USING LNG

(75) Inventor: Charles W. Morrow, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 48 days.

(21) Appl. No.: 10/965,577

(22) Filed: Oct. 14, 2004

Related U.S. Application Data

(60) Provisional application No. 60/511,147, filed on Oct. 14, 2003.

(51) Int. Cl.
*F01K 25/06* (2006.01)
(52) U.S. Cl. .............................. 60/649; 60/651; 60/671; 60/659
(58) Field of Classification Search .................. 60/649, 60/651, 659, 671
See application file for complete search history.

(56) References Cited

U.S. PATENT DOCUMENTS

| 3,225,538 | A | * | 12/1965 | Bland et al. ................... 60/649 |
| 3,992,891 | A | | 11/1976 | Pocrnja |
| 4,215,553 | A | * | 8/1980 | Poirier et al. ................. 60/650 |
| 4,329,842 | A | | 5/1982 | Hoskinson |
| 4,330,998 | A | | 5/1982 | Nozawa |
| 4,392,346 | A | | 7/1983 | Fink |
| 4,422,298 | A | | 12/1983 | Nozawa |
| 4,429,536 | A | | 2/1984 | Nozawa |
| 4,444,015 | A | | 4/1984 | Matsumoto et al. |
| 4,995,234 | A | | 2/1991 | Kooy et al. |
| 5,457,951 | A | | 10/1995 | Johnson et al. |
| 6,089,028 | A | | 7/2000 | Bowen et al. |
| 6,116,031 | A | | 9/2000 | Minta et al. |
| 6,195,997 | B1 | | 3/2001 | Lewis et al. |
| 6,336,316 | B1 | | 1/2002 | Fujii et al. |
| 6,367,258 | B1 | | 4/2002 | Wen et al. |
| 6,374,591 | B1 | | 4/2002 | Johnson et al. |

OTHER PUBLICATIONS

Charles W. Morrow, "On Synergy Between a High Temperature Gas-cooled Reactor and a LNG Vaporization Plant", Proceeding of ICONE 12 Apr. 25-29.

Malcolm P. Labar, The Gas turbine-Modular Helium Reactor: A Promising Option for Near Term Deployment, Figure 1 GT-MHR Module, Apr. 2002.

* cited by examiner

*Primary Examiner*—Hoang Nguyen
(74) *Attorney, Agent, or Firm*—Robert D. Watson

(57) ABSTRACT

A modified, closed-loop Brayton cycle power conversion system that uses liquefied natural gas as the cold heat sink media. When combined with a helium gas cooled nuclear reactor, achievable efficiency can approach 68–76% (as compared to 35% for conventional steam cycle power cooled by air or water). A superheater heat exchanger can be used to exchange heat from a side-stream of hot helium gas split-off from the primary helium coolant loop to post-heat vaporized natural gas exiting from low and high-pressure coolers. The superheater raises the exit temperature of the natural gas to close to room temperature, which makes the gas more attractive to sell on the open market. An additional benefit is significantly reduced costs of a LNG revaporization plant, since the nuclear reactor provides the heat for vaporization instead of burning a portion of the LNG to provide the heat.

18 Claims, 10 Drawing Sheets

HIGH EFFICIENCY BRAYTON CYCLES USING LNG

CROSS-REFERENCE TO RELATED APPLICATIONS

This application claims the benefit of U.S. Provisional Patent Application Ser. No. 60/511,147 filed Oct. 14, 2003, which is incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to power conversion systems for generating electricity from a power plant (coal-fired, nuclear, etc.), and more specifically to a very high efficiency (68–76%) system for converting heat generated by a high-temperature helium gas cooled nuclear reactor (HTGR) into electricity, where liquefied natural gas (LNG) is used as the cold heat sink media in a modified, closed-loop Brayton cycle, instead of conventional water or air. This improvement is due to the large temperature difference (1010 degrees) between the helium gas coolant (850 C) and LNG (−160 C). With such a large temperature difference, a Carnot thermal efficiency can theoretically approach 90%. Achievable efficiencies are in the range of 68–76%, roughly double that of 35% for conventional steam cycle power plants, and larger than 48% for current HTGR designs cooled with ambient air or water. An added benefit is that the LNG is converted to pressurized natural gas at close to ambient temperature, ready to be used by consumers, with significantly reduced costs for revaporizing the LNG. By using this synergistic system, the energy originally expended into liquefying the natural gas prior to shipping overseas can be efficiently recovered. Ideally, the LNG receiving terminal is co-located close to the power plant to eliminate the need to transport LNG overland.

SUMMARY OF THE INVENTION

The present invention relates to a modified, closed-loop Brayton cycle power conversion system that uses liquefied natural gas as the cold heat sink media. When combined with a helium gas cooled nuclear reactor, achievable efficiency can approach 65–75% (as compared to 35% for conventional steam cycle power cooled by air or water). A superheater heat exchanger can be used to exchange heat from a side-stream of hot helium gas split-off from the primary helium coolant loop to post-heat vaporized natural gas exiting from low and high-pressure coolers. The superheater raises the exit temperature of the natural gas to close to room temperature, which makes the gas more attractive to sell on the open market. An additional benefit is significantly reduced costs of a LNG revaporization plant, since the nuclear reactor provides the heat for vaporization instead of burning a portion of the LNG to provide the heat.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

We define the achievable or Brayton cycle efficiency as the ratio of the generator power to the reactor's thermal power.

Figure 1:
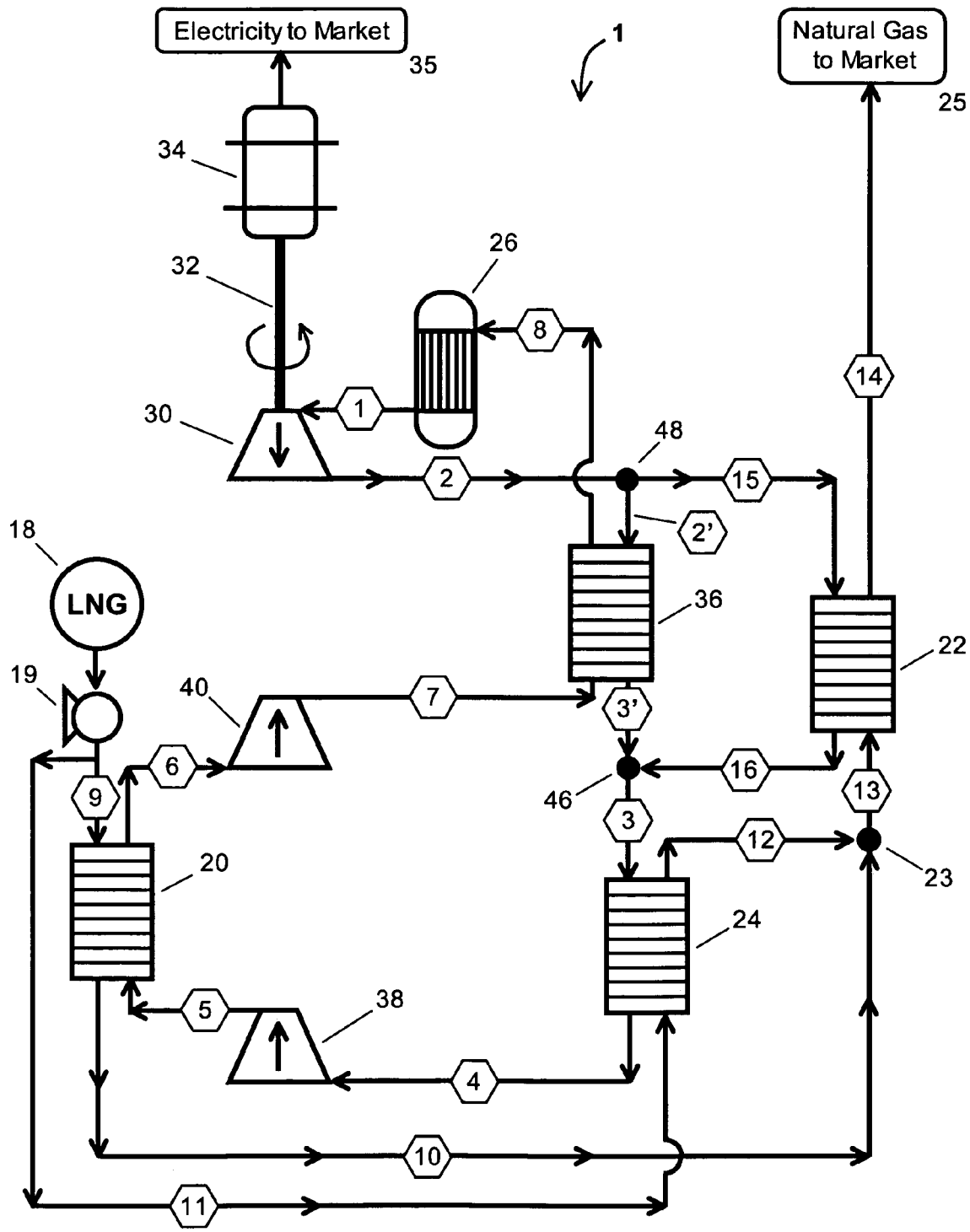
FIG. 1 shows a schematic flow configuration of a first example of a power conversion system, according to the present invention.

FIG. 1 shows a schematic flow configuration of a first example of a power conversion system, according to the present invention. Note: in all of the figures, the numbers located inside of the hexagon-shaped symbol identify individual flow streams between two adjacent locations.

In this design, all of the hot helium exiting from reactor 26 as stream #1 passes through power turbine 30, and then is divided into two streams at T-junction 48, with most of the flow (stream #2') continuing in the normal manner through recuperator 36. The split-off side-stream (stream #15) of helium goes to heat exchanger 22, which is called a superheater, where it heats the cold natural gas exiting from coolers 20 and 24 to a more preferable range of outlet temperatures (e.g., 0–25 C). Without a superheater 22, the natural gas exit temperature would be too cold (for example, −70 C) to be sold on the open market 25.

In the primary closed-loop, helium gas coolant system, hot high-pressure helium (e.g., 850 C) exits from a high-temperature, gas-cooled nuclear reactor 26 and then goes through a series of three expander turbines that extract energy from the system as shaft power. The first two turbines (not illustrated for simplicity) return work to the system by driving compressors 38 and 40, while the last turbine 30 drives a generator 34 via shaft 32 to produce electricity for sale. Helium gas temperature drops slightly through the turbines, while the pressure drop across turbine 30 is large (e.g., from 7 bar to 2.5 bar). This low-pressure (e.g., 2.5 bar) and moderate temperature gas (e.g., 500 C) then goes through a recuperator and a series of coolers and compressors to return it to high pressure for heating by the reactor, thereby completing the closed-loop cycle.

More specifically, after leaving HTGR 26, the hot helium gas (stream #1) enters a first turbine 30, which is called a power turbine. The drive shaft 32 of power turbine 30 can be connected to generator 34 to provide electricity to market 35. After leaving power turbine 30 (stream #2), the flow of helium gas is split at T-junction 48 into two streams, i.e., a main stream (#2'), and a smaller side-stream #15. The side-stream (#15) comprises a fraction of the total helium gas flow, for example, 1–10%.

The main stream of helium gas (stream #2') travels from T-junction 48 to a first heat exchanger 36, which is called a recuperator (or economizer or regenerator). After passing through recuperator 36, the main stream is rejoined with the side-stream of helium (stream #16) at T-junction 46. Then, the recombined stream (stream #3) enters another heat exchanger 24, which is called a low-pressure (LP) cooler (or precooler or suction cooler). After passing through LP cooler 24, the helium gas (stream #4) then enters a first compressor 38, which is called a low-pressure (LP) compressor. Then, the helium gas flows (stream #5) to another heat exchanger 20, which is called a high-pressure (HP) cooler or intercooler. After passing through HP cooler 20, the helium (stream #6) flows to a second compressor 40, which is called a high-pressure (HP) compressor. The LP and HP coolers 24, 20 reduce compressor inlet temperatures by rejecting heat to a cold heat transfer media, e.g., LNG, to maximize helium density, thereby reducing compression power needs. After passing through HP compressor 40, the helium (stream #7) flows back to recuperator 36, where it is reheated. Recuperator 36 transfers heat from the moderately hot power turbine outlet to the colder HP compressor 20 discharge. This energy exchange reduces the heat load on the reactor, while simultaneously reducing the cooling load on LP cooler 24. After passing through recuperator 36, the helium (stream #8) flows back to HTGR reactor 26 for heating, thereby completing the primary coolant's closed-loop cycle.

Continuing, according to the present invention, the split-off side-stream (stream #15) of helium gas travels from T-junction 48 to another heat exchanger 22, which is called a superheater. After passing through superheater 22, the side-stream (stream #16) is recombined with the main stream at T-junction 46, prior to entering LP cooler 24.

Turning now to the open-loop LNG heat sink system, liquefied natural gas is pumped from cryogenic storage tank 18 (where the LNG is stored at atmospheric pressure and at the saturation temperature of liquid NG, i.e. 112 K (–160 C)) by cryogenic pump 19 to HP cooler 20 and LP cooler 24 via streams #9 and #11, respectively. Coolers 20 and 24 vaporize some, or all, of the incoming LNG into a gaseous phase (i.e., Natural Gas or NG). Then, after passing through coolers 20 and 24, the two exit streams #10 and #12 of NG are recombined at T-junction 23 into a single stream #13. The rejoined stream #13 then enters superheater 22. Superheater 22, which may be a gas-to-gas plate-and-frame heat exchanger, heats the natural gas to a temperature greater than 0° C., and preferably around ambient, ready to enter the open market 25.

Figure 2:
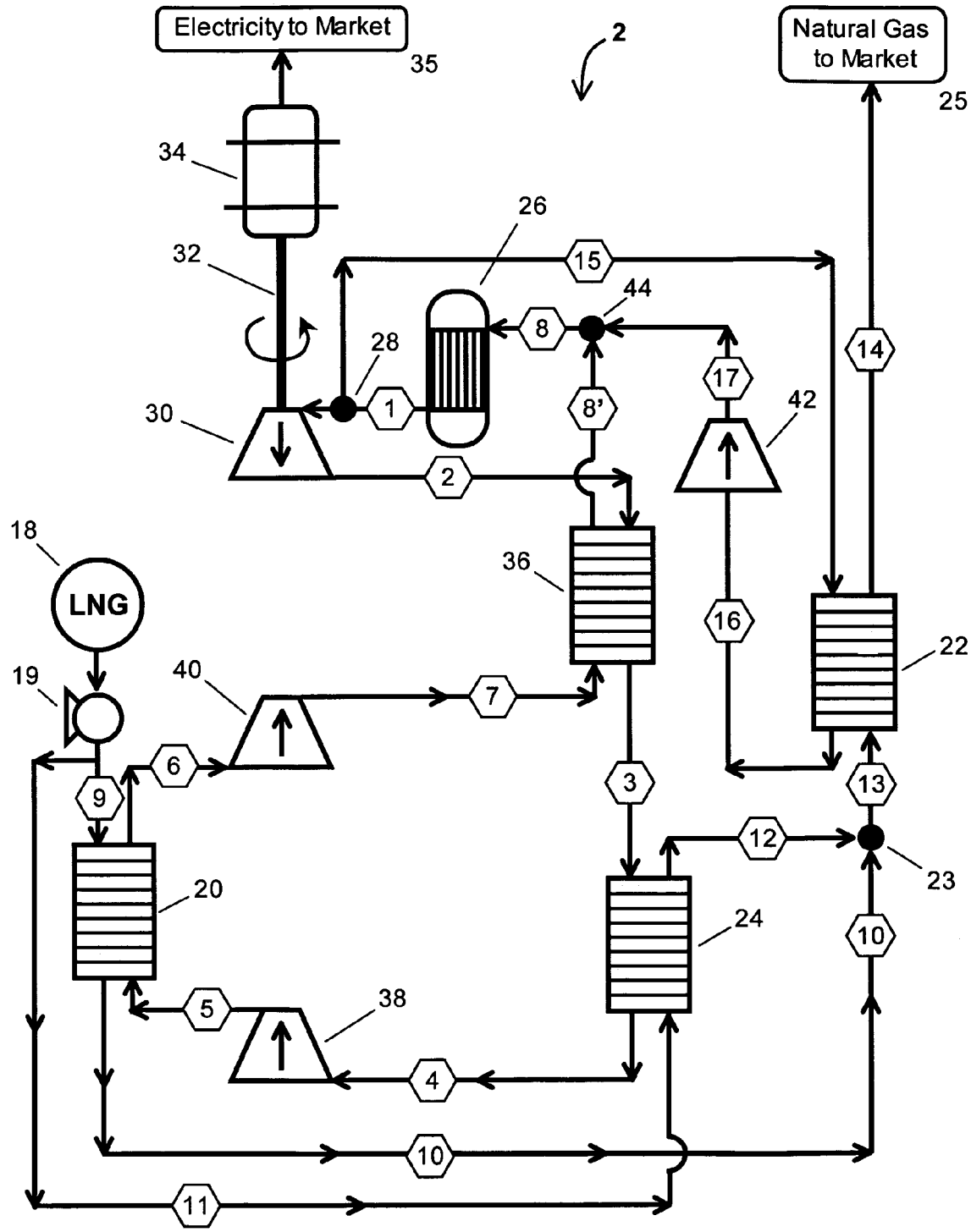
FIG. 2 shows a schematic flow configuration of second example of a power conversion system, according to the present invention.

FIG. 2 shows a schematic flow configuration of a second example of a power conversion system 2, according to the present invention. This embodiment is essentially the same as shown in FIG. 1, except that the split-off side-stream of hot helium gas has a different flow configuration than in FIG. 1. Never-the-less, the configuration of the primary flow of helium gas and LNG is substantially the same as shown in FIG. 1.

In FIG. 2, hot helium gas exits HTGR reactor 26 as stream #1, and then is split-off at T-junction 28 into two streams: a main stream that goes to power turbine 30, and a smaller side-stream #15. Hot helium gas in side-stream #15 bypasses power turbine 30 and, instead, travels directly to superheater 22. After passing through superheater 22, side-stream #16 passes through a blower 42, where its pressure is increased to a pressure sufficiently high to allow it to return to reactor 26. After passing through blower 42, side-stream #17 is then recombined at T-junction 44 with the primary helium stream #8' exiting from recuperator 36. Finally, the combined stream #8 returns to reactor 26 for heating, thereby completed the closed-loop. In FIG. 2, hotter and higher-pressure helium is provided to superheater 22; however, with the added cost of having to provide a blower 42.

Tables 1–2 illustrate some example of typical results (e.g., mass flow rates, temperature, pressure, entropy and enthalpy) generated by a simple computer model for various flow conditions, as applied to the designs of FIGS. 1 and 2, assuming the same hypothetical HTGR 26 having a thermal power of 600 MW in each case. In the simplified model, HP and LP compressor power was assumed to be the same by holding the inlet helium temperature, pressure, and flow rate constant for stream #8.

In Table 1, which corresponds to the example configuration shown in FIG. 1, the maximum He gas temperature is 850 C, and the maximum He pressure is 7.1 bars. The side-stream (#15, #16) of helium gas comprises 7.4% of the total helium gas flow. The exit temperature and pressure of the vaporized natural gas to market (stream #14) is 5 C and 9.2 bars. The generator output power is 488 MW, which results in an achievable efficiency of 76.2% for this example.

In Table 2, which corresponds to the example configuration shown in FIG. 2, the maximum helium gas temperature is 850 C, and the maximum pressure is 7.1 bars. The side-stream (#15, #16, #17) of helium gas comprised 5% of the total helium gas flow. The exit temperature and pressure of the exiting natural gas to market (stream #14) is 5 C and 9.2 bars. The generator output power is 451 MW, which results in an achievable efficiency of 71.7% for this design.

These calculations show that the design shown in FIG. 1 has a higher efficiency than the design shown FIG. 2. This may be because all of the helium flow goes through the power turbine 30 in FIG. 1. Of course, both designs have roughly double the efficiency of a conventional steam cycle power plants (33–35%) cooled by ambient air or water. Plus, the cost of vaporizing the LNG is greatly reduced, by more than 50%.

FIGS. 1 and 2 illustrate examples of using a two-stage compressor design with intermediate cooling (e.g., intercooler 20). Typically, the reason one uses a pair of compressors (with intercooling in-between them) is that compressor discharge temperatures get too hot for available elastomers and seals when using only one compressor cooled by air or water. So, an intercooler 20 is added to reduce the final temperature. However, with the use of a liquified cold heat sink media (e.g., LNG), it is possible to eliminate the second (HP) compressor 40 and associated intercooler 20, and return to a single-stage design with a single suction cooler 24 and compressor 38. This is because the use of LNG reduces the elastomer and seal temperatures, thereby permitting the use of a single-stage design. This change reduces the plant's complexity and capital cost, but at the expense of efficiency.

Figure 3:
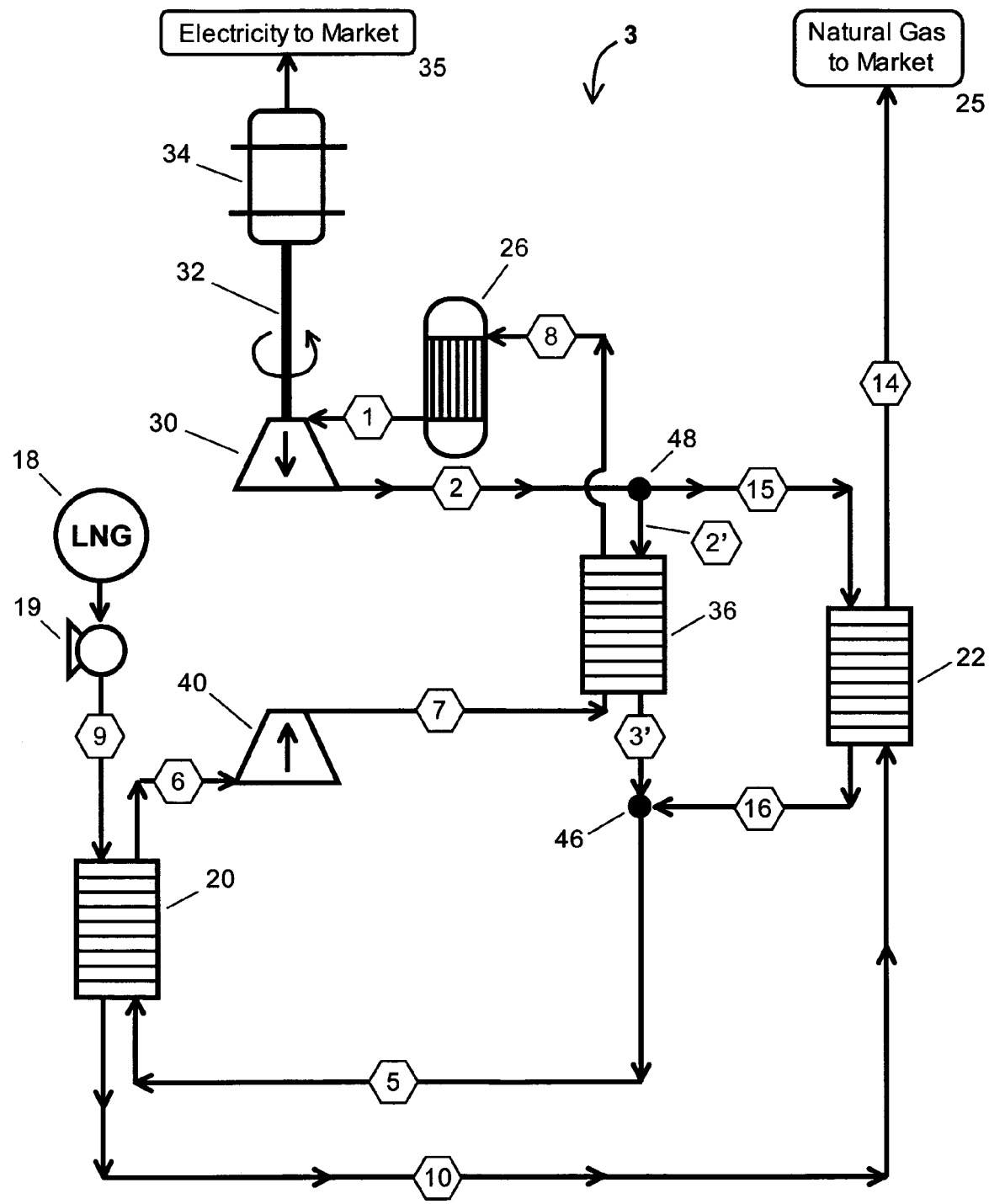
FIG. 3 shows a schematic flow configuration of a third example of a power conversion system, according to the present invention.
Figure 4:
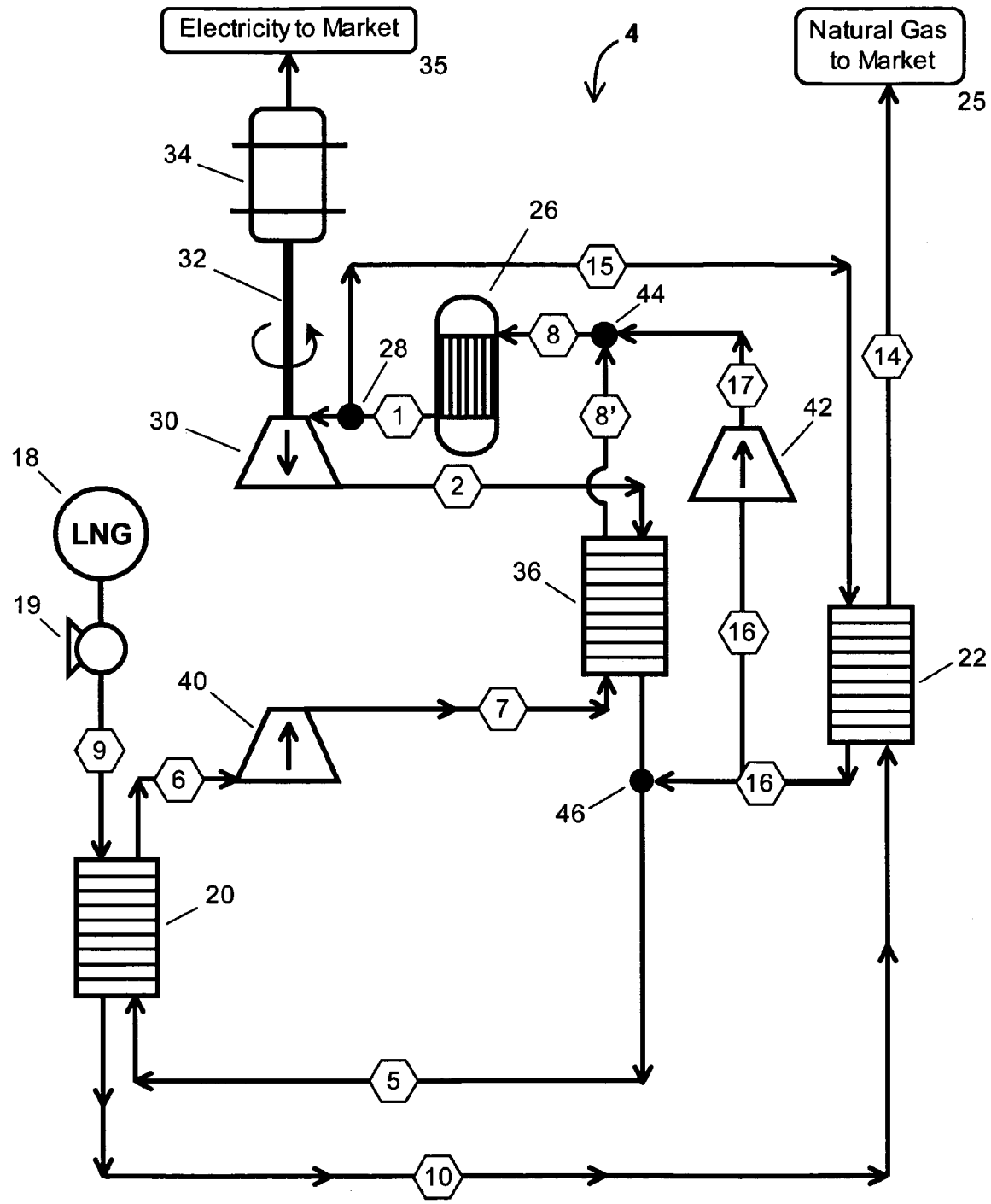
FIG. 4 shows a schematic flow configuration of fourth example of a power conversion system, according to the present invention.

FIGS. 3 and 4 show schematic flow configurations of third and fourth examples of a power conversion system, according to the present invention. These embodiments are essentially identical to the embodiments shown in FIGS. 1 and 2, respectively, with the exception that the two-stage compressor design in FIGS. 1 and 2 has been replaced with a single-stage compressor configuration in FIGS. 3 and 4. In FIGS. 3 and 4, heat exchanger 20 is called a suction cooler, and compressor 40 is called a compressor.

In Table 3, which corresponds to the example configuration shown in FIG. 3, the maximum helium gas temperature is 850 C, and the maximum pressure is 7.1 bars. The side-stream (#15, #16, #17) of helium gas comprised 4.4% of the total helium gas flow. The exit temperature and pressure of the exiting natural gas to market (stream #14) is 5 C and 9.8 bars. The generator output power is 451 MW, which results in an achievable efficiency of 73.2% for this design.

Figure 5:
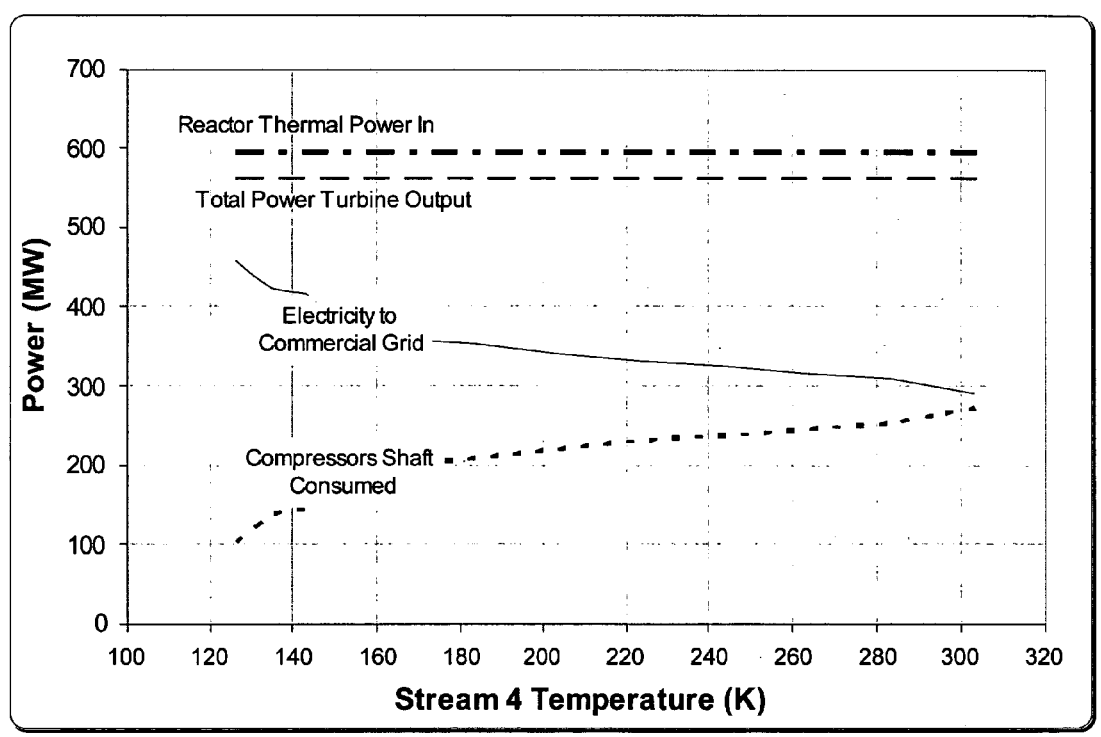
FIG. 5 shows a plot of Power versus Stream 4 Temperature, according to the present invention.
Figure 6:
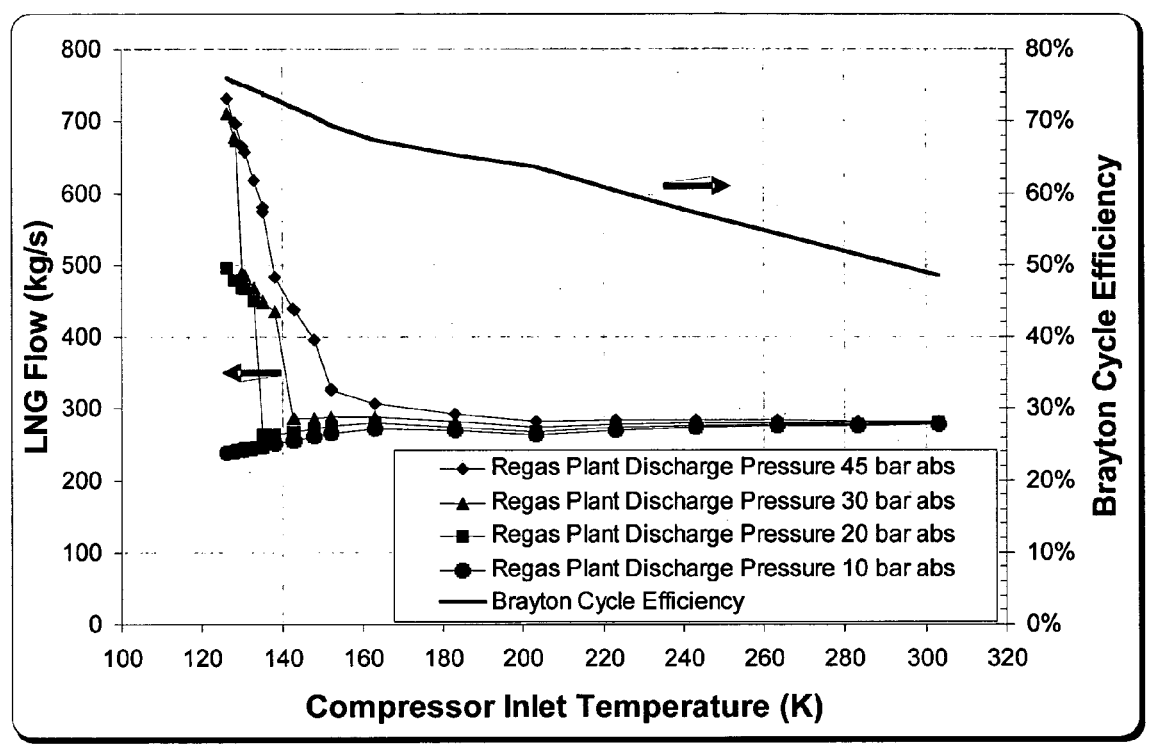
FIG. 6 shows a plot of LNG Flow and Brayton Cycle Efficiency versus Compressor Inlet Temperature, according to the present invention.

Returning now to FIGS. 1 and 2, which have a two-stage compressor design, sensitivity studies were performed using the simple computer model to investigate the systematic effect of changing the inlet temperature of the liquefied heat sink media (i.e., by changing the temperature of stream #4, which is the inlet to the LP compressor 38) over a wide range, from 120 K to 300 K. FIG. 5 shows a plot of Power versus Stream 4 Temperature, according to the present invention. FIG. 6 shows a plot of LNG Flow and Brayton Cycle Efficiency versus Compressor Inlet Temperature, according to the present invention. As shown in FIGS. 5 and 6, both the power generated by power turbine 30, and the achievable Brayton Cycle efficiency, increase approximately linearly as the compressor inlet temperature decreases. At a compressor inlet temperature of 126 K, the efficiency is 77%. The efficiency decreases to the familiar 48% for a helium-cooled HTGR cooled by ambient air or water.

According to FIG. 6, for the higher-pressure curves, the required LNG flow increases suddenly as compressor temperature inlet drops to the point that the LNG does not completely vaporize in the HP and LP coolers. In order to avoid needing higher LNG flow rates, and, the effects of two-phase flow in outlet lines, higher LNG out pressures dictate higher LP and HP compressor inlet temperatures. This, in turn, results in lower Brayton cycle efficiencies. However, higher NG outlet pressures may be required in order for the revaporized natural gas to enter a pipeline system at a node operating at high pressure, e.g., 45 bar (650 psi). This level of LNG pressure, hence, may limit the power plant's efficiency in order to avoid two-phase flow in natural gas piping from the LP and HP coolers.

Figure 7:
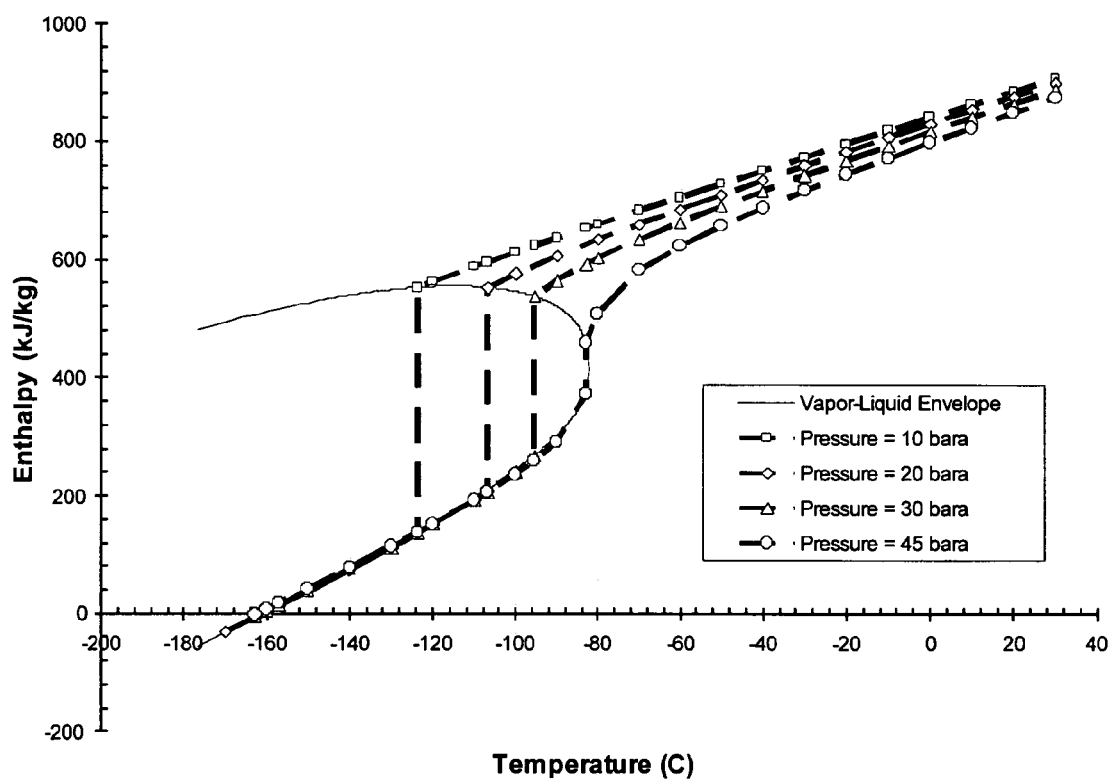
FIG. 7 shows a plot of Enthalpy versus Temperature for Natural Gas (i.e., Methane), according to the present invention.

FIG. 7 illustrates the effect of changing the discharge pressure of cryogenic pump 19 from 10 to 40 bars on the vapor-liquid envelope of Enthalpy versus Temperature for methane (a close approximation to natural gas), according to the present invention. For example, at a pressure of 10 bars, methane changes phase from liquid to gas (i.e., boils) at about –116 C.

Figure 8:
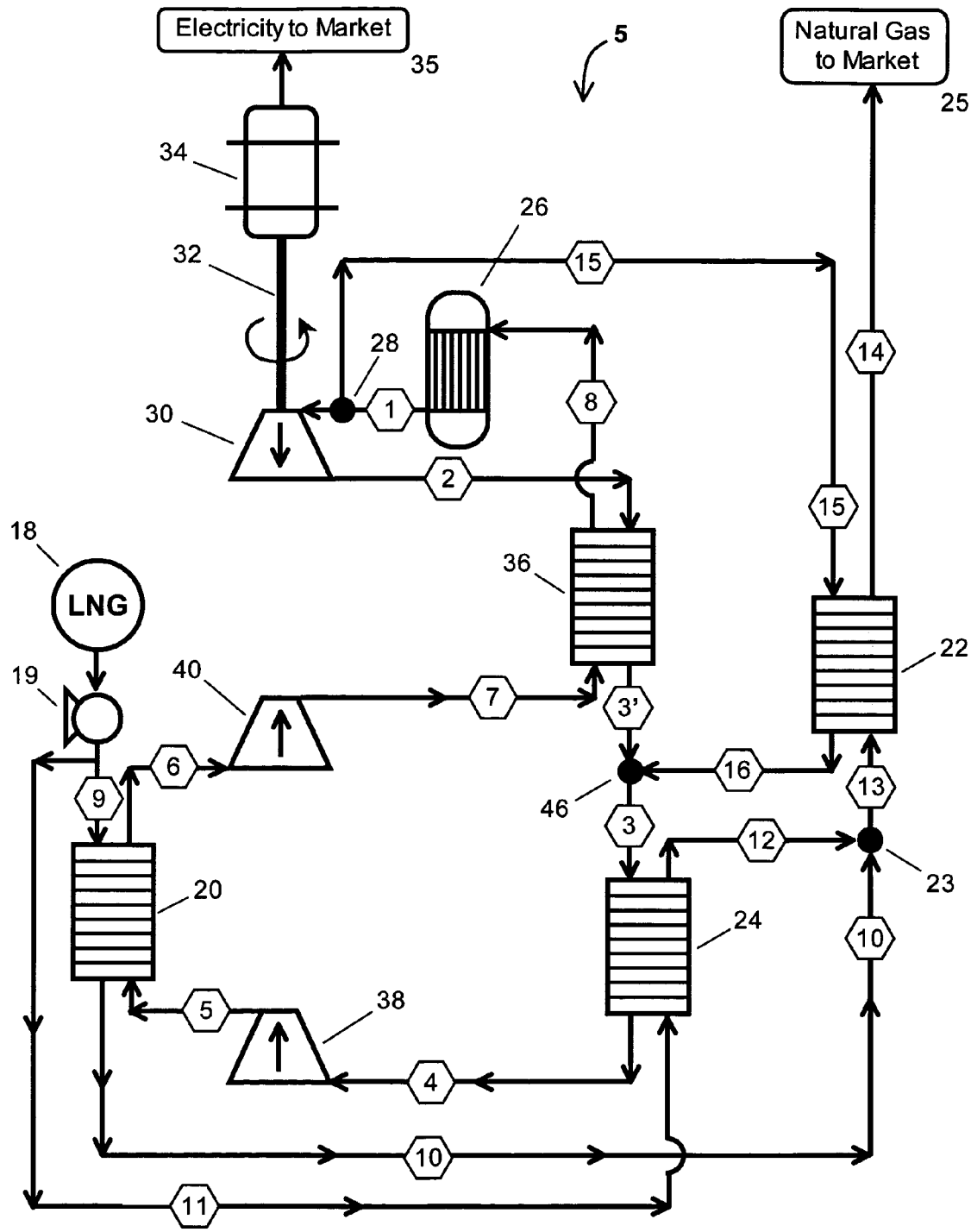
FIG. 8 shows a schematic flow configuration of fifth example of a power conversion system, according to the present invention.

FIG. 8 shows a schematic flow configuration of fifth example of a power conversion system, according to the present invention. This configuration is nearly identical to that shown in FIG. 2; except that in FIG. 8, blower 17 has been eliminated, and the output of helium gas from superheater 22 (i.e., stream #16) is now redirected to T-junction 46, where it recombines with the main helium gas stream #3' exiting from recuperator 36 to make a combined primary stream #3.

Figure 9:
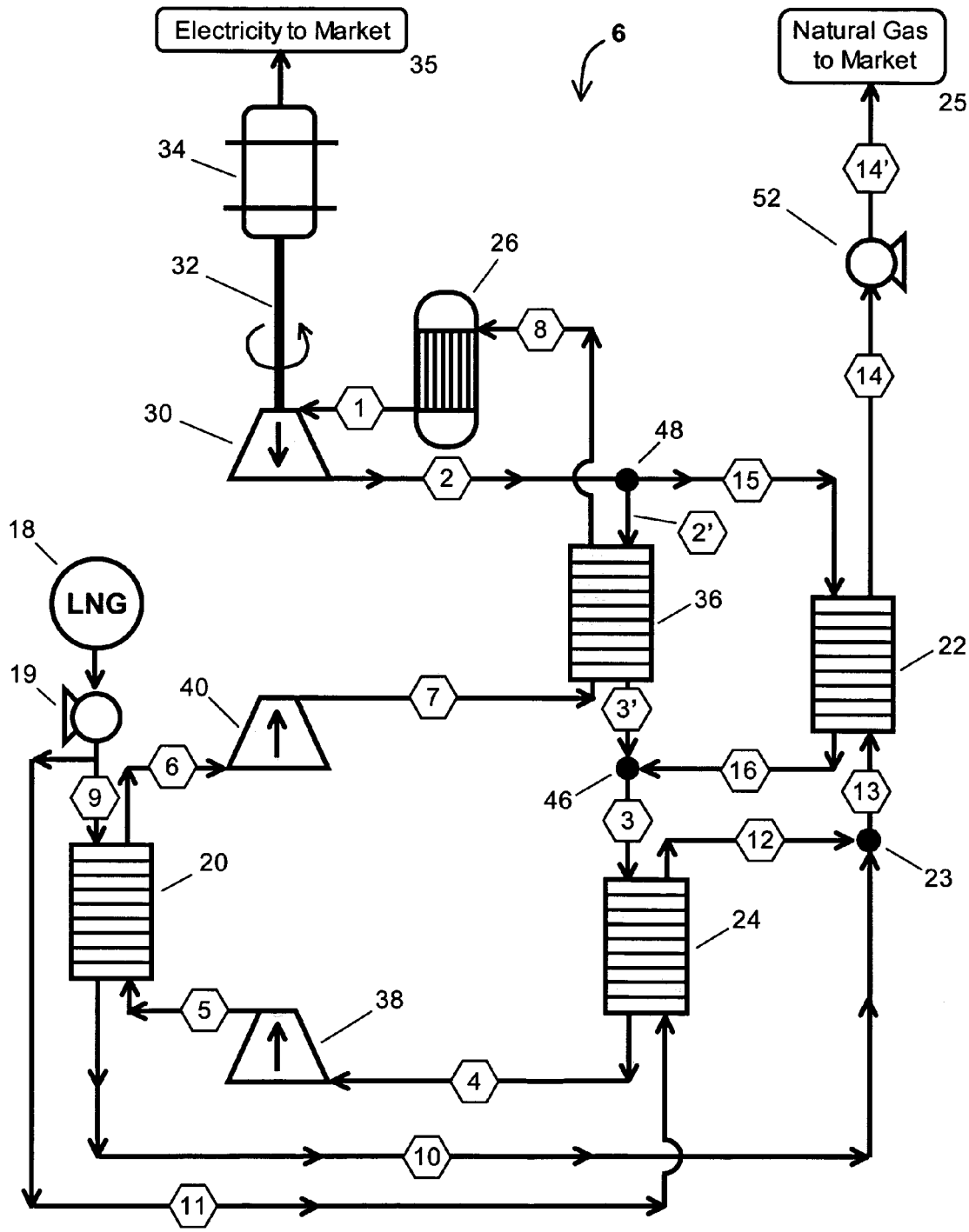
FIG. 9 shows a schematic flow configuration of sixth example of a power conversion system, according to the present invention.

FIG. 9 shows a schematic flow configuration of sixth example of a power conversion system, according to the present invention. This configuration is nearly identical to that shown in FIG. 1, except that in FIG. 9, a post-superheater blower 52 has been added to the NG exit piping means (streams #14, 14') to raise the exit pressure and temperature of the NG after exiting from superheater 22 before it is supplied to market. This embodiment allow the pressure of LNG before it enters LP and HP coolers 20, 22 to be low, e.g., 7–10 bar, which results in a larger plant efficiency; while using post-superheater blower 52 to increase the NG exit pressure sufficiently high so as to slightly exceed the pipeline network pressure (e.g. 40–50 bar). Essentially, use of post-superheater blower 52 allows the choice of an optimum LNG supply pressure (streams #9 and 11) to be de-coupled from the choice of an optimum NG exit pressure (stream #14).

In Table 4, which corresponds to the example configuration shown in FIG. 9, the maximum helium gas temperature is 850 C, and the maximum pressure is 7.1 bars. The side-stream (#15, #16) of helium gas comprised 2.9% of the total helium gas flow. The exit temperature and pressure of the exiting natural gas to market (stream #14) is 11 C and 23.7 bars. The generator output power is 450 MW, which results in an achievable efficiency of 71.2% for this design.

Figure 10:
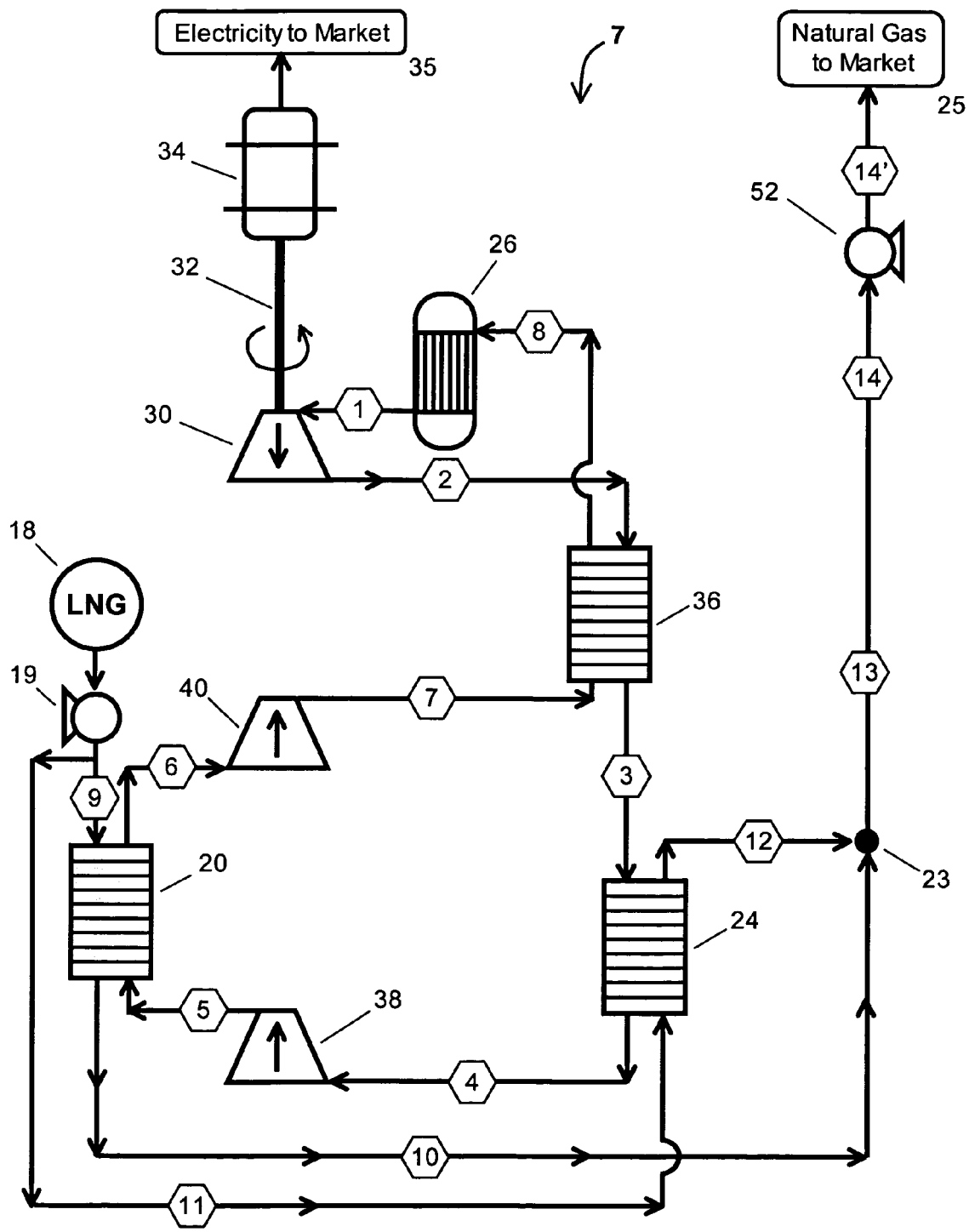
FIG. 10 shows a schematic flow configuration of seventh example of a power conversion system, according to the present invention.

FIG. 10 shows a schematic flow configuration of seventh example of a power conversion system, according to the present invention. This configuration is nearly identical to that shown in FIG. 9, except that in FIG. 10, superheater 22 has been deleted, along with its associated side-streams #15 and #16 and #2'. Superheater 22 can be deleted because post-superheater blower 52 can be sized appropriately to not only increase the exit pressure of the NG in stream #14', but also to increase the exit temperature of the NG to a more reasonable temperature, e.g., greater than 0 C, and preferably up to ambient.

In Table 5, which corresponds to the example configuration shown in FIG. 10, the maximum helium gas temperature is 850 C, and the maximum pressure is 7.1 bars. There is no side-stream of helium gas in this example. The exit temperature and pressure of the exiting natural gas to market (stream #14) is –3 C and 50 bars, which is high enough pressure to be injected into interstate pipeline networks. The generator output power is 450 MW, which results in an achievable efficiency of 68.8% for this design.

It will be appreciated that other cold heat sink heat transfer media may be used in place of LNG in the present invention. For example, liquefied hydrogen, ethane, methane, propane, butane, or ammonia, or combinations thereof, may be used in place of LNG. These examples satisfy the criteria that the media's normal boiling point at ambient pressure is lower than water; or, alternatively, where the cold heat sink heat transfer media has a boiling point less than ambient temperature.

It will also be appreciated that the present invention may use other types of heat sources than a nuclear reactor; for example, oil-fired, coal-fired, gas-fired, solar-fired, and hydrogen-fired heat sources. Additionally, gases other than helium may be used as the primary coolant media, including, for example, air, all inert gases, nitrogen, neon, and argon, and combinations thereof, for example, a gas mixture containing 50% helium. The primary coolant gas should not freeze or liquefy at its coldest temperature.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A closed-loop Brayton power conversion system, comprising:
   A. a heat source;
   B. a power turbine;
   C. a recuperator;
   D. a suction cooler;
   E. a compressor;
   F. a superheater;
   G. an insulated storage tank for storing cold, liquefied heat sink media;
   H. a pump for pumping the liquefied heat sink media from the storage tank (G) to the suction cooler (D);
   I. primary coolant loop piping means for conveying a primary stream of a heat transfer gas in the following closed-loop flow sequence: from component A to B to C to D to E, back to C, and then back to A; wherein the entire sequence is cyclically repeated;
   J. side-stream piping means for conveying a fraction of the heat transfer gas in a side-stream that splits-off from the primary coolant loop piping means at a first T-junction located in-between power turbine (B) and recuperator (C); and then flows through superheater (F); and finally to a second T-junction located in-between recuperator (C) and suction cooler (D); at which point the side-stream is recombined with the primary stream of heat transfer gas before entering suction cooler (D); and
   K. heat sink piping means for conveying the cold, liquefied heat sink media from storage tank (G) to pump (H); then to suction cooler (D) where the liquefied heat sink media is substantially vaporized; then to superheater (F); and finally to exit piping means for delivering the vaporized heat sink media to market.

2. The system of claim 1,
   wherein the suction cooler comprises a pair of coolers comprising a low pressure cooler ($D_{low}$) and a high pressure cooler ($D_{high}$);
   wherein the compressor (E) comprises a pair of compressors comprising a low pressure compressor ($E_{low}$) and a high pressure compressor ($E_{high}$); and
   wherein the primary coolant loop piping means (I) for conveying the primary stream of heat transfer gas comprises the following closed-loop flow sequence: from A to B to C to $D_{low}$ to $E_{low}$ to $D_{high}$ to $E_{high}$, back to C, and then back to A; wherein the entire modified sequence is cyclically repeated.

3. The system of claim 1, wherein the superheater comprises a plate-and-frame heat exchanger.

4. The system of claim 1, wherein the heat transfer gas comprises one or more gases selected from the group consisting of helium, air, an inert gas, nitrogen, neon, argon, and combinations thereof.

5. The system of claim 1, wherein the liquefied heat sink media comprises a gas whose boiling point is lower than ambient temperature.

6. The system of claim 5, wherein the liquefied heat sink media comprises one or more gases selected from the group consisting of liquefied natural gas, liquefied hydrogen, liquefied ethane, liquefied methane, liquefied propane, liquefied butane, and liquefied ammonia, and combinations thereof.

7. The system of claim 1, wherein the heat source comprises one or more sources selected from the group consisting of a nuclear energy source, a oil-fired source, a coal-fired source, a gas-fired source, a solar-fired source, a hydrogen-fired source, and combinations thereof.

8. The system of claim 1, wherein the fraction of the primary stream of heat transfer gas conveyed in the side-stream comprises about 1–10% of the total flow of heat transfer gas flowing through the primary coolant loop piping means.

9. The system of claim 1,
   wherein the heat transfer gas comprises helium having a maximum temperature of about 850 C;
   wherein the liquefied heat sink media comprises liquefied natural gas stored at a temperature of about –160 C; and
   wherein the vaporized natural gas leaves the exit piping means at an exit temperature greater than about 0 C.

10. The system of claim 1, wherein the liquefied heat sink media that enters the suction cooler as a liquid, exits said cooler in a substantially vaporized state.

11. The system of claim 1, further comprising a generator, driven by the power turbine, for generating electricity to market.

12. A method for converting power using a modified closed-loop Brayton power conversion system, comprising:
   a) providing a heat source (A), a power turbine (B), a recuperator (C), a suction cooler (D), a compressor (E), a superheater (F), an insulated storage tank for storing cold liquefied heat sink media (G), a pump (H) for pumping the liquefied heat sink media from storage tank (G) to suction cooler (D), and associated piping means;
   b) providing a heat transfer gas and a liquefied heat sink media to the system;
   c) conveying a primary stream of the heat transfer gas through closed-loop primary coolant loop piping means from component A to B to C to D to E, back to C, and then back to A; followed by cyclically repeating the entire sequence;
   d) conveying a side-stream of heat transfer gas, split-off from the primary stream of heat transfer gas, from a first T-junction located in-between power turbine (B) and recuperator (C); then to superheater (F); and finally to a second T-junction located in-between recuperator (C) and suction cooler (D), where the side-stream is recombined with the primary stream of heat transfer gas before entering suction cooler (D); and
   e) pumping the liquefied heat sink media from storage tank (G) to suction cooler (D), where the liquefied heat sink media is substantially vaporized; then to superheater (F) where the vaporized gas is heated; and finally to exit piping means for delivering the vaporized heat sink media to market.

13. The method of claim 12, wherein the fraction of heat transfer gas conveyed in the side-stream comprises about 1–10% of the total flow of heat transfer gas flowing through the primary coolant loop piping means.

14. The method of claim 12,
wherein the heat transfer gas comprises helium having a maximum temperature of about 850 C;
wherein the liquefied heat sink media comprises liquefied natural gas stored at a temperature of about −160 C; and
wherein the vaporized natural gas leaves the exit piping means at an exit temperature greater than about 0 C.

15. The method of claim 12, further comprising using the power turbine to drive a generator for making electricity.

16. The method of claim 15, further comprising using the power turbine to drive a generator for making electricity.

17. The system of claim 1, further comprising a post-superheater blower, disposed in the exit piping means, for increasing the pressure and temperature of the vaporized heat sink media after exiting from the superheater.

18. The method of claim 12, further comprising a post-superheater blower, disposed in the exit piping means, for increasing the pressure and temperature of the vaporized heat sink media after exiting from the superheater.

* * * * *